United States Patent
Son et al.

(10) Patent No.: US 11,086,171 B2
(45) Date of Patent: Aug. 10, 2021

(54) LIQUID CRYSTAL DISPLAY

(71) Applicant: Samsung Display Co., Ltd., Yongin-si (KR)

(72) Inventors: Sun-Kwun Son, Gunpo-si (KR); Sang-Moon Moh, Hwaseong-si (KR); Jin-Suk Seo, Cheonan-si (KR); Mi-Sun Lee, Goyang-si (KR); Hye-Rhee Han, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/442,903

(22) Filed: Jun. 17, 2019

(65) Prior Publication Data
US 2019/0302507 A1    Oct. 3, 2019

Related U.S. Application Data

(60) Continuation of application No. 15/785,377, filed on Oct. 16, 2017, now Pat. No. 10,359,671, which is a
(Continued)

(30) Foreign Application Priority Data

Mar. 4, 2011    (KR) .................. 10-2011-0019395

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1339* (2013.01); *G02F 1/133345* (2013.01);
(Continued)

(58) Field of Classification Search
CPC ............ G02F 1/1339; G02F 1/133512; G02F 1/133516; G02F 1/133345; G02F 1/1341
See application file for complete search history.

(56) References Cited

U.S. PATENT DOCUMENTS 6,558,971 B2   5/2003   Hsieh et al.
6,638,694 B2   10/2003  Ikemoto et al.
(Continued)

FOREIGN PATENT DOCUMENTS

JP   1980-88026    7/1980
JP   11-326883    11/1999
(Continued)

OTHER PUBLICATIONS

Non-Final Office Action dated Apr. 8, 2014, in U.S. Appl. No. 13/210,921.
(Continued)

*Primary Examiner* — Dung T Nguyen
(74) *Attorney, Agent, or Firm* — H.C. Park & Associates, PLC

(57) ABSTRACT

A display device including a first substrate comprising a first surface, a second substrate overlapping the first substrate and including a second surface overlapping the first surface, a display unit between the first substrate and the second substrate, and a supporting assistance member disposed between the first surface and the second surface, in which the supporting assistance member includes a first region and a second region, at least one of the first substrate and the second substrate includes a third region and a fourth region, transmittance of the first region is higher than transmittance of the second region, transmittance of the third region is higher than transmittance of the fourth region, and the
(Continued)

second region surrounds the first region, the fourth region surrounds the third region, and the first region and the third region overlap each other.

11 Claims, 4 Drawing Sheets

Related U.S. Application Data continuation of application No. 15/133,801, filed on Apr. 20, 2016, now Pat. No. 9,798,196, which is a continuation of application No. 14/734,382, filed on Jun. 9, 2015, now Pat. No. 9,341,897, which is a division of application No. 13/210,921, filed on Aug. 16, 2011, now Pat. No. 9,081,236.

(51) Int. Cl.
*G02F 1/1333* (2006.01)
*G02F 1/1341* (2006.01)
*G02F 1/1362* (2006.01)
*G02F 1/1368* (2006.01)

(52) U.S. Cl.
CPC .. G02F 1/133512 (2013.01); G02F 1/133516 (2013.01); *G02F 1/1341* (2013.01); *G02F 1/1368* (2013.01); *G02F 1/13392* (2013.01); *G02F 1/13396* (2021.01); *G02F 1/133351* (2013.01); *G02F 1/133514* (2013.01); *G02F 1/136286* (2013.01)

(56) References Cited

U.S. PATENT DOCUMENTS

| 6,690,032 | B1 | 2/2004 | Umetsu |
| 7,630,122 | B2 | 12/2009 | Uchida |
| 7,667,795 | B2 | 2/2010 | Li et al. |
| 8,373,839 | B2 | 2/2013 | Ito et al. |
| 8,395,704 | B2 | 3/2013 | Verstegen et al. |
| 9,081,234 | B2 | 7/2015 | Yang et al. |
| 9,081,236 | B2 | 7/2015 | Son et al. |
| 9,798,196 | B2 | 10/2017 | Son et al. |
| 2006/0023135 | A1 | 2/2006 | Park |
| 2007/0177094 | A1 | 8/2007 | Van Dam et al. |
| 2008/0018835 | A1 | 1/2008 | Li et al. |
| 2010/0165266 | A1 | 7/2010 | Sakata et al. |
| 2012/0014687 | A1 | 1/2012 | Sanford |
| 2012/0027247 | A1 | 2/2012 | Hirsa et al. |
| 2012/0105400 | A1 | 5/2012 | Mathew et al. |
| 2015/0036097 | A1 | 2/2015 | Clerc et al. |

FOREIGN PATENT DOCUMENTS

| JP | 3296590 | 4/2002 |
| JP | 2003-167241 | 6/2003 |
| JP | 2007-286396 | 11/2007 |
| KR | 10-0317703 | 12/2001 |
| KR | 10-0387603 | 6/2003 |
| KR | 10-0798627 | 1/2008 |
| KR | 10-2008-0023020 | 3/2008 |
| KR | 10-0837591 | 6/2008 |
| KR | 10-0879925 | 1/2009 |
| KR | 10-2009-0022862 | 3/2009 |
| KR | 10-2009-0046049 | 5/2009 |
| KR | 10-0919281 | 9/2009 |
| KR | 10-2010-0019709 | 2/2010 |
| KR | 10-2010-0069896 | 6/2010 |

OTHER PUBLICATIONS

Final Office Action dated Aug. 4, 2014, in U.S. Appl. No. 13/210,921.
Notice of Allowance dated Nov. 12, 2014, in U.S. Appl. No. 13/210,921.
Notice of Allowance dated Apr. 14, 2015, in U.S. Appl. No. 13/210,921.
Notice of Allowance dated Jan. 29, 2016, in U.S. Appl. No. 14/734,382.
Non-Final Office Action dated Jan. 12, 2017, in U.S. Appl. No. 15/133,801.
Notice of Allowance dated Jun. 26, 2017, in U.S. Appl. No. 15/133,801.
Non-Final Office Action dated Feb. 21, 2018, in U.S. Appl. No. 15/785,377.
Final Office Action dated Oct. 18, 2018, in U.S. Appl. No. 15/785,377.
Advisory Action dated Dec. 31, 2018, in U.S. Appl. No. 15/785,377.
Notice of Allowance dated Mar. 13, 2019, in U.S. Appl. No. 15/785,377.

LIQUID CRYSTAL DISPLAY

CROSS-REFERENCE TO RELATED APPLICATIONS

This application is a Continuation of U.S. application Ser. No. 15/785,377, filed on Oct. 16, 2017, which is a Continuation of U.S. patent application Ser. No. 15/133,801, filed on Apr. 20, 2016, now issued as U.S. Pat. No. 9,798,195, which is a Continuation of U.S. patent application Ser. No. 14/734,382 filed on Jun. 9, 2015, now issued as U.S. Pat. No. 9,341,897, which is a Divisional of U.S. patent application Ser. No. 13/210,921, filed on Aug. 16, 2011, now issued as U.S. Pat. No. 9,081,236, and claims priority from and the benefit of Korean Patent Application No. 10-2011-0019395 filed on Mar. 4, 2011, each of which is hereby incorporated by reference for all purposes as if fully set forth herein.

BACKGROUND OF THE INVENTION

Field

The following description relates to an apparatus including a liquid crystal display.

Discussion of the Background

Liquid crystal displays (LCDs) are one of the most widely used flat panel displays, and an LCD includes a pair of panels provided with field-generating electrodes and a liquid crystal (LC) layer interposed between the two panels. The LCD displays images by applying voltages to the field-generating electrodes to generate an electric field in the LC layer that determines the orientation of LC molecules therein to adjust polarization of incident light.

Liquid crystal displays are applied to various portable products such as mobile phones, personal portable terminals, and laptops. Portable products include devices having a function such as cameras, microphones, and modules. Modules are inserted into a through-hole and are supported by a sealant.

However, there is a limit in reduction of an area occupied by the sealant supporting the through-hole by a coating characteristic of the sealant when forming the through-hole by using the sealant. Also, when a separate process to reduce the size of the area is added, the manufacturing process becomes more complicated.

SUMMARY OF THE INVENTION

Exemplary embodiments of the present invention provide a liquid crystal display and a manufacturing method simplifying a manufacturing process while minimizing an area of a supporter supporting a through-hole.

Additional features of the invention will be set forth in the description which follows, and in part will be apparent from the description, or may be learned by practice of the invention.

An exemplary embodiment of the present invention discloses a liquid crystal display includes: a first substrate including a first through-hole; a second substrate facing the first substrate and including a second through-hole corresponding to the first through-hole; a sealant coupling the first substrate and the second substrate; a liquid crystal layer disposed between the first substrate and the second substrate; a spacer disposed between the first substrate and the second substrate; and a supporting assistance member including a third through-hole connected to the first through-hole and the second through-hole, wherein the supporting assistance member includes a first supporting assistance member made with the same material as the spacer.

A method for manufacturing a liquid crystal display according to the present invention includes: forming a supporting assistance member on a first substrate, the supporting assistance member comprising a first through-hole; coupling a second substrate and the first substrate together, the second substrate contacting the supporting assistance member; and attaching an etching layer to the first substrate and the second substrate; forming a second through-hole and a third through-hole in the first substrate and the second substrate, respectively, wherein the second through-hole and the third through-hole are connected to the first through-hole.

DETAILED DESCRIPTION OF THE ILLUSTRATED EMBODIMENTS

Figure 1:
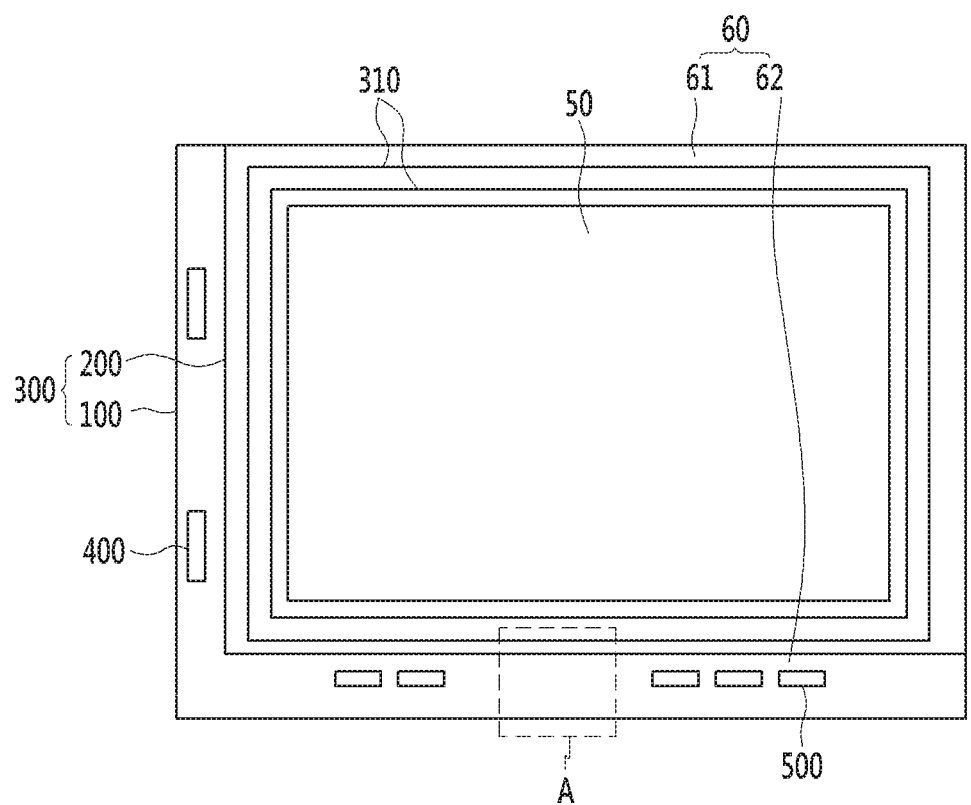
FIG. 1 is a top plan view of a liquid crystal display according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

A liquid crystal display according to an exemplary embodiment of the present invention will be described with reference to FIG. 1-FIG. 5.

FIG. 1 is a top plan view of a liquid crystal display according to an exemplary embodiment.

In an exemplary embodiment, a liquid crystal display includes a lower panel 100 and an upper panel 200 facing each other and a liquid crystal layer (not shown) interposed there between. The lower panel 100 and the upper panel 200 together form a liquid crystal panel assembly 300.

Meanwhile, in a view point of a plane structure, the lower panel 100 and the upper panel 200 include a display area 50 for displaying an image and a peripheral area 60 surrounding it.

The display area 50 includes a plurality of signal lines (not shown) and a plurality of pixels (not shown) connected thereto and arranged approximately in a matrix.

The signal lines are provided in the lower panel 100, and include a plurality of gate lines (not shown) transmitting a gate signal (referred to as "scanning signal") and a plurality of data lines (not shown) transmitting a data voltage.

Each pixel includes a switching element (not shown) such as a thin film transistor connected to the signal lines, a pixel electrode (not shown) connected to the switching element and formed in the lower panel 100, a common electrode (not shown) formed in the upper panel 200, and a liquid crystal layer (not shown). The pixel electrode receives the data voltage through the switching element. The common electrode is formed on the whole surface of the upper panel 200 and receives the common voltage ("Vcom").

If the gate line is applied with the gate signal, the data voltage is applied to the pixel electrode of the lower panel 100 through the data line, and the pixel electrode forms an electric field to the liquid crystal layer along with the common electrode of the upper panel 200 applied with the common voltage. Thus, the degree of polarization of light incident to the liquid crystal layer is changed according to the inclination degree of liquid crystal molecules of the liquid crystal layer and the change of polarization is represented as a change of transmittance by a polarizer, and thereby a LCD displays an image.

The peripheral area 60 includes a first peripheral area 61 formed in both the lower panel 100 and the upper panel 200, and a second peripheral area 62 formed in only the upper panel 200 and exposing the lower panel 100. The second peripheral area 62 is disposed around the first peripheral area 61.

A sealant 310 is formed in the first peripheral area 61. The sealant 310 combines and fixes the lower panel 100 and the upper panel 200 and encloses the liquid crystal layer. The sealant 310 is formed based on the circumference of the display area 50, and may include conductive balls (not shown) having conductivity.

A gate driver 400 and a data driver 500 are positioned in the second peripheral area 62. The gate driver 400 is connected to the gate lines of the display area 50, and applies gate signals obtained by combining a gate-on voltage ("Von") for turning on a switching element and a gate-off voltage ("Voff") for turning off the switching element to the gate lines. The data driver 500 is connected to the data line of the display area 50 and applies the data voltage to the data lines. The gate driver 400 and the data driver 500 may be directly mounted on the lower panel 100 in the second peripheral area 62 in the form of at least one integrated circuit (IC) chip, may be mounted on a flexible printed circuit film (not shown) as a tape carrier package (TCP) type that is attached to the lower panel 100, or may be integrated in the lower panel 100 along with the thin film transistor.

Figure 2:
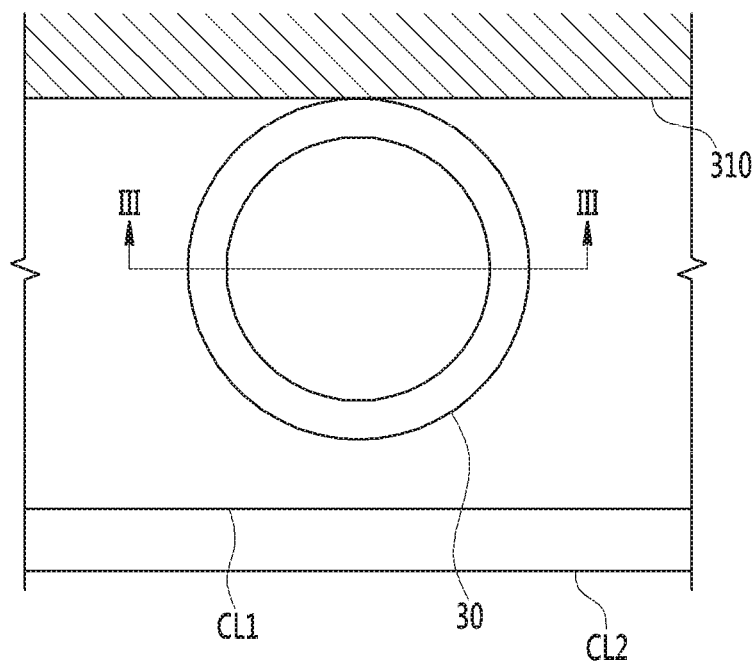
FIG. 2 is an enlarged view of a portion A of the liquid crystal display shown in FIG. 1.
Figure 3:
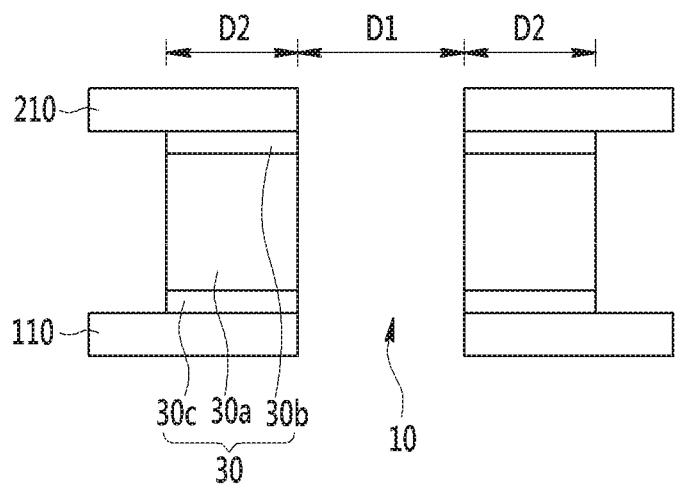
FIG. 3 is a cross-sectional view taken along the line III-III of FIG. 2.

FIG. 2 is an enlarged view of a portion A of the liquid crystal display shown in FIG. 1. FIG. 3 is a cross-sectional view taken along the line III-III of FIG. 2.

Referring to FIG. 2 and FIG. 3, a supporting assistance member 30 is positioned between a lower substrate 110 and an upper substrate 210.

The supporting assistance member 30 is disposed between the sealant 310 and a cutting line CL1 of the lower substrate 110, and forms a cylinder including a through-hole 10. The supporting assistance member may contact the sealant 310, as shown in FIG. 2. In an exemplary embodiment, the supporting assistance member 30 may be separated from the sealant 310.

In an exemplary embodiment, when forming the cylindrical through-hole 10, the pressure applied to the supporting assistance member 30 is uniform compared with a conventional quadrilateral supporting assistance member having a cylindrical shaped through-hole, in which distances from the center of the through-hole to the edges of the quadrangle are different. In an alternative exemplary embodiment, the supporting assistance member 30 may be quadrangular shaped and the through-hole 10 may also be a quadrangular shaped. For example, the supporting assistance member 30 and the through-hole 10 may be prism shaped. By forming the through-hole 10 and the supporting assistance member 30 of the same shape, the pressure applied to the supporting assistance member 30 when forming the through-hole 10 may be uniformly maintained.

In an exemplary embodiment, the diameter D1 of the through-hole 10 may be in the range of 3.65 mm to 5.65 mm, and the width D2 of the supporting assistance member 30 may be in the range of 0.5 mm to 0.7 mm. In an exemplary embodiment, the width of the supporting assistance member 30 is formed of an area based on the resolution of a light exposer to reduce the area. However when the supporting assistance member 30 is less than 0.5 mm, it may not endure the pressure of the upper and the lower substrates. When a material of the supporting assistance member 30 becomes to be stronger, a width of the supporting assistance member 30 may be less than 0.5 mm.

The supporting assistance member 30 contacts a lower substrate 110 and an upper substrate 210 thereby supporting the two substrates. The supporting assistance member 30 includes a first supporting assistance member 30a, a second supporting assistance member 30b, and a third supporting assistance 30c. In exemplary embodiments, the height of the supporting assistance member 30 may be changed based on a cell gap, and may be in the range of 3.0 μm to 4.0 μm.

The first supporting assistance member 30a is positioned in the display area, and may be made of the same material as a spacer maintaining the interval between the lower substrate 110 and the upper substrate 210.

The second supporting assistance member 30b used to assist the first supporting assistance member 30a may be at least one of an edge light blocking member preventing light leakage between the pixels and external light from being incident to the liquid crystal layer, a red color filter, a green color filter, and a blue color filter. The third supporting assistance member 30c may be at least one of: an insulating material layer and a metal layer such as a gate line and a data line that are formed in the display area. In an exemplary embodiment, the insulating material layer may be made of silicon oxide, silicon nitride, or an organic material having a low dielectric ratio such as a gate insulating layer and a passivation layer. The second supporting assistance member 30b and the third supporting assistance member 30c may be variably formed based on the layer that is formed on the upper substrate 210 and the lower substrate 110.

A common electrode, an alignment layer, a light blocking member, a plurality of insulating layers, pixel electrodes, and metal wires may be positioned on or under the spacer in the display area, the size of the cell gap may be changed according to layers formed at a portion where the spacer is positioned, and therefore the second supporting assistance member 30b and the third supporting assistance member 30c may be selectively formed on or under the first supporting assistance member 30a.

A silicon layer may be formed on the inner surface of the supporting assistance member 30. When forming the supporting assistance member 30 by etching, the inner surface of the supporting assistance member 30 may be damaged, however the silicon layer is formed at the damaged portion such that the inner surface may be uniform. In exemplary embodiments, the silicon layer may be omitted.

A manufacturing method of a liquid crystal display will be described with reference to FIG. 4 as well as FIG. 1 and FIG. 2.

Figure 4:
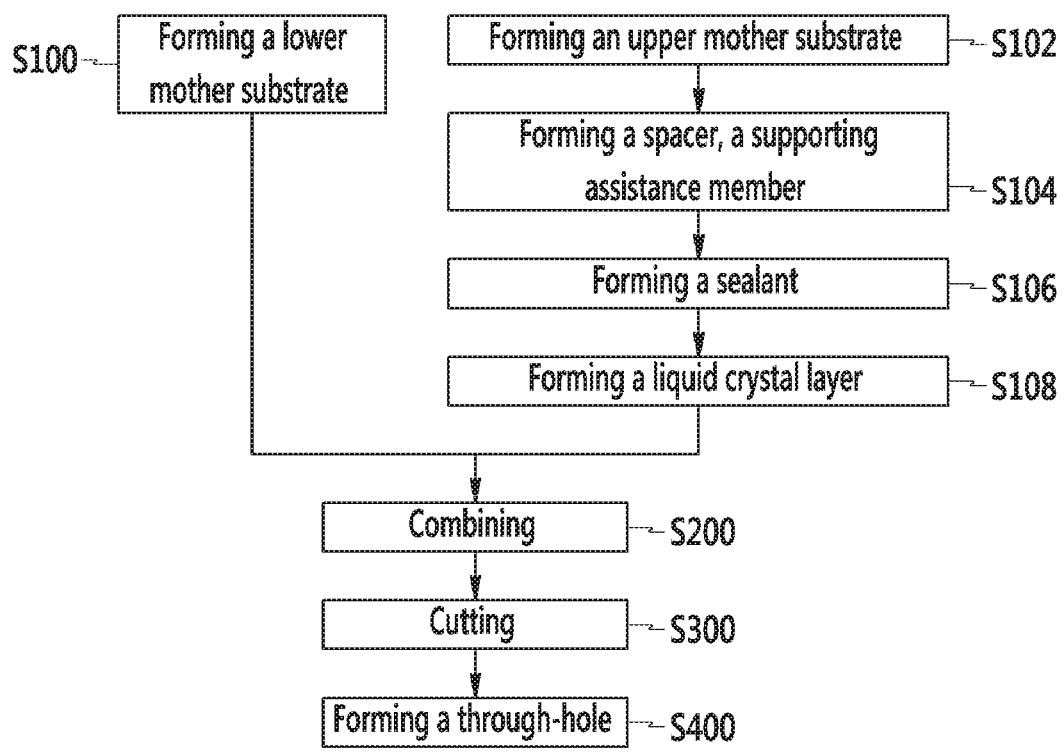
FIG. 4 is a flowchart showing a manufacturing sequence of a liquid crystal cell for a liquid crystal display according to an exemplary embodiment.
Figure 5:
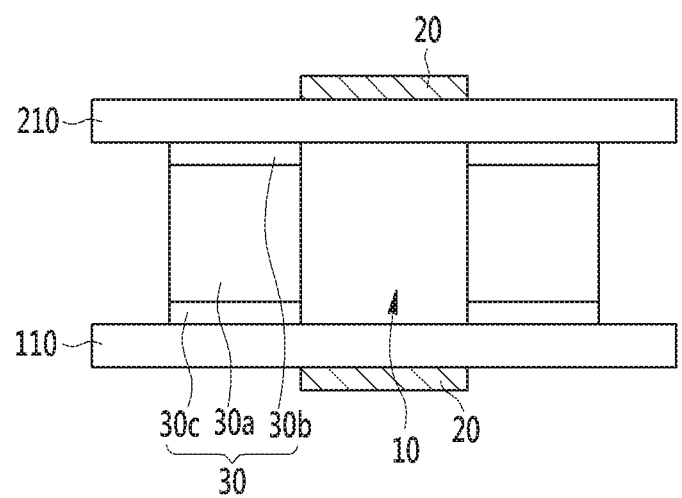
FIG. 5 is a cross-sectional view of area 50 of FIG. 1.

FIG. 4 is a flowchart showing a manufacturing sequence of a liquid crystal cell for a liquid crystal display according to an exemplary embodiment. FIG. 5 is a cross-sectional view of area 50 of FIG. 1 and is depicted to assist in explaining a manufacturing sequence of a liquid crystal display according to an exemplary embodiment.

Referring to FIG. 4, lower and upper mother substrates are formed, in operations S100 and S102, respectively. The upper mother substrate may include a common electrode and a color filter. In exemplary embodiments, the color filter may be formed on the lower mother substrate. The lower mother substrate may include a pixel electrode and a thin film transistor corresponding to the common electrode and the color filter of the upper mother substrate.

In operation S104, a spacer of cylindrical shape, and a supporting assistance member are formed on one of the upper or lower mother substrates through a photolithography process. The supporting assistance member is positioned at a portion corresponding to the position of a light blocking member formed on the lower or upper mother substrate.

In exemplary embodiments, the supporting assistance member is simultaneously formed with the same material as the spacer and therefore an additional formation process is not required. The spacer and the supporting assistance member are formed through the photolithography process. Through the photolithography process the pattern size may be controlled as a micro-unit in comparison with forming the through-hole 10 in a sealant, thereby the area occupied by the through-hole 10 may be lowered. If the spacer has photosensitivity, it may be patterned by using a photo-process.

In operation S106 a sealant made of a material to combine the upper and lower mother substrates, to define a region where a liquid crystal is filled, and to prevent the liquid crystal from leaking is applied. The sealant may be a light hardening material or a thermal hardening material.

In operation S108, the liquid crystal is dripped onto the region defined by the sealant to form a liquid crystal layer. In an exemplary embodiment, the liquid crystal cell may be pre-formed and the liquid crystal may be inserted into the liquid crystal cell.

In operation S200, the upper and lower mother substrates are combined by aligning and loading the upper and lower mother substrates into a press apparatus. The sealant hardens to combine the upper and lower mother substrates.

The upper and lower mother substrates are cut at cutting lines to divide the combined upper and lower mother substrates into individual liquid crystal cells in operation S300.

Referring to FIG. 2, the supporting assistance member 30 is positioned between the cutting line C1 and the sealant 310 of the upper substrate 210 of the upper panel 200.

In operation S400, a through-hole is formed in the upper substrate and the lower substrate of the liquid crystal cell. As shown in FIG. 5, the through-hole of the substrate is formed by attaching an etching layer 20 including an etchant onto the outer surface of the substrates 110 and 210. The etching layer 20 is an adhesive film which includes a material that has adhesion and etching properties. This material may be made of an etchant using a hardening resin, a light polymerizing initiator, a hard setting adhesive made of a sensitizer, an organic silicate compound, and additives.

The etching layer 20 is formed to be positioned at a portion corresponding to the through-hole 10 of the supporting assistance member 30 such that the through-hole of the substrate and the through-hole of the supporting assistance member may be connected. Next, a module such as a camera or a microphone is inserted into the through-hole.

According to an exemplary embodiment, the process of forming the through-hole may be simplified and the area occupied by the through-hole may be reduced in comparison with a through-hold formed in just the sealant.

According to an exemplary embodiment, the through-hole of the substrate is formed using an etching layer and advantageously simplifies the manufacturing process.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
a first substrate comprising a first surface;
a second substrate overlapping the first substrate and comprising a second surface facing the first surface;
a display unit between the first substrate and the second substrate; and
a supporting assistance member comprising a first region and a second region, the first and second regions disposed between the first surface and the second surface,
wherein:
at least one of the first substrate and the second substrate comprises a third region and a fourth region;
transmittance of the first region is higher than transmittance of the second region;
transmittance of the third region is higher than transmittance of the fourth region; and
the second region surrounds the first region, the fourth region surrounds the third region, and the first region and the third region overlap each other.

2. The display device of claim 1, wherein both the first substrate and the second substrate comprise the third region and the fourth region.

3. The display device of claim 1, wherein the supporting assistance member has substantially a cylindrical shape.

4. The display device of claim 3, wherein the first region comprises a hole, and a diameter of the hole is in the range of about 3.65 mm to about 5.65 mm.

5. The display device of claim 4, wherein a diameter of the supporting assistance member is a sum of the diameter of the hole and a value in the range of about 0.5 mm to about 0.7 mm.

6. The display device of claim 1, further comprising a spacer disposed between the first substrate and the second substrate,
wherein the supporting assistance member includes a first supporting assistance member comprising the same material as the spacer.

7. The display device of claim 6, further comprising:
a light blocking member disposed between the first substrate and the second substrate; and
a color filter disposed between the first substrate and the second substrate, wherein the supporting assistance member further comprises a second supporting assistance member comprising the same material as at least one of the light blocking member and the color filter.

8. The display device of claim 7, wherein the supporting assistance member further comprises a third supporting assistance member comprising an insulating material or metal.

9. The display device of claim 8, wherein the first supporting assistance member, the second supporting assistance member, and the third supporting assistance member overlap the second region.

10. The display device of claim 8, wherein the first supporting assistance member, the second supporting assistance member, and the third supporting assistance member overlap the fourth region.

11. The display device of claim 8, wherein the third supporting assistance member, the first supporting assistance member, and the second supporting assistance member are sequentially stacked.

* * * * *